United States Patent [19]

Hawkins

[11] 4,012,582
[45] Mar. 15, 1977

[54] DAMPING SPACERS FOR CONDUCTOR BUNDLES

[75] Inventor: Ronald G. Hawkins, Massena, N.Y.

[73] Assignee: Aluminum Company of America, Pittsburgh, Pa.

[22] Filed: Mar. 29, 1976

[21] Appl. No.: 671,360

Related U.S. Application Data

[63] Continuation-in-part of Ser. No. 626,975, Oct. 29, 1975, Pat. No. 3,971,881.

[52] U.S. Cl. .................................. 174/42; 174/146
[51] Int. Cl.² ...................... H02G 7/14; H02G 7/12
[58] Field of Search ............................. 174/42, 146

[56] References Cited

UNITED STATES PATENTS 3,617,609  11/1971  Tuttle ................................. 174/42
3,870,815  3/1975  Hawkins .............................. 174/42

*Primary Examiner*—Laramie E. Askin
*Attorney, Agent, or Firm*—Elroy Strickland

[57] ABSTRACT

An ultra light weight, frameless damping spacer for spacing at least two parallel, overhead conductors, the damping spacer comprising at least two rigid spacer arms and conductor clamping members, with the clamping members being respectively located at one end of the spacer arms, and integral housings respectively located at the other ends of the arms. Each housing is provided with an opening and a resilient damping member wholly contained within the opening and housing. The spacer arms are disposed and held together by a rigid pin extending through each housing and through an opening in each arm aligned with the housings.

3 Claims, 11 Drawing Figures

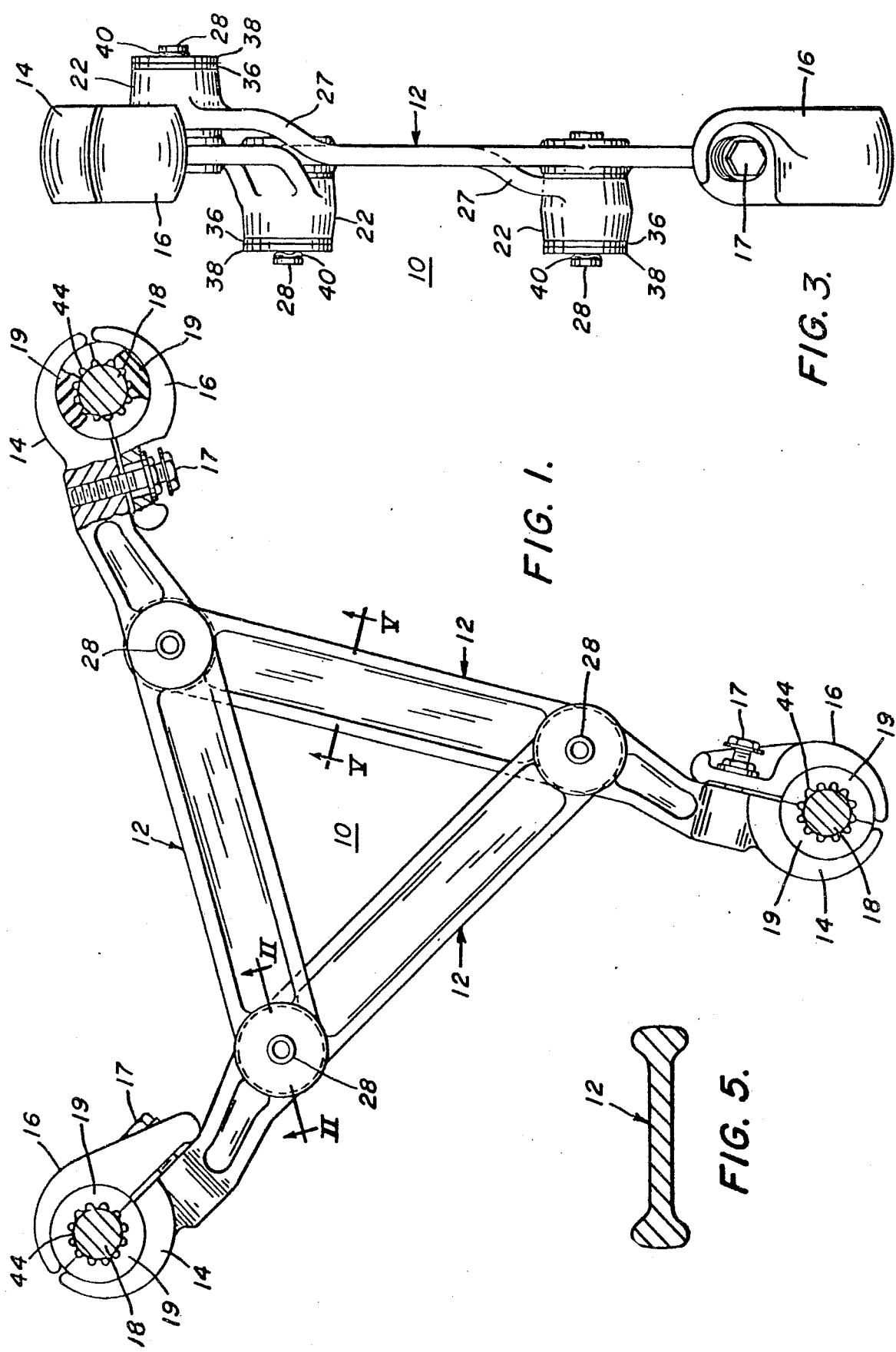

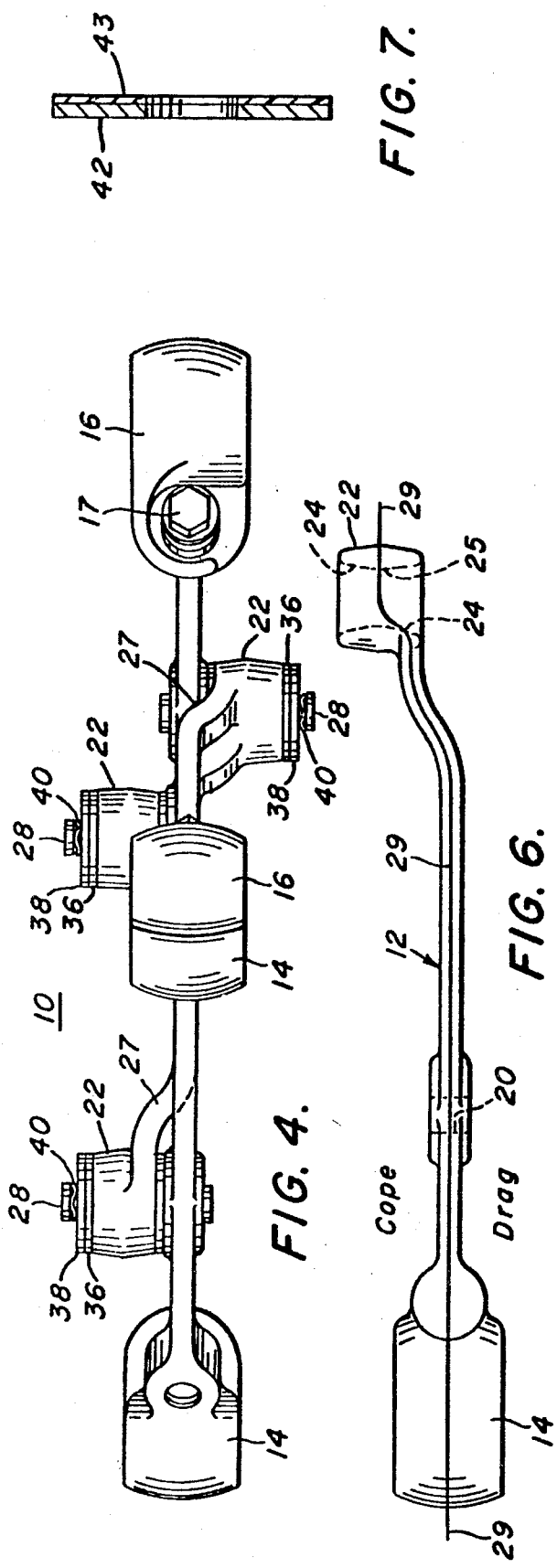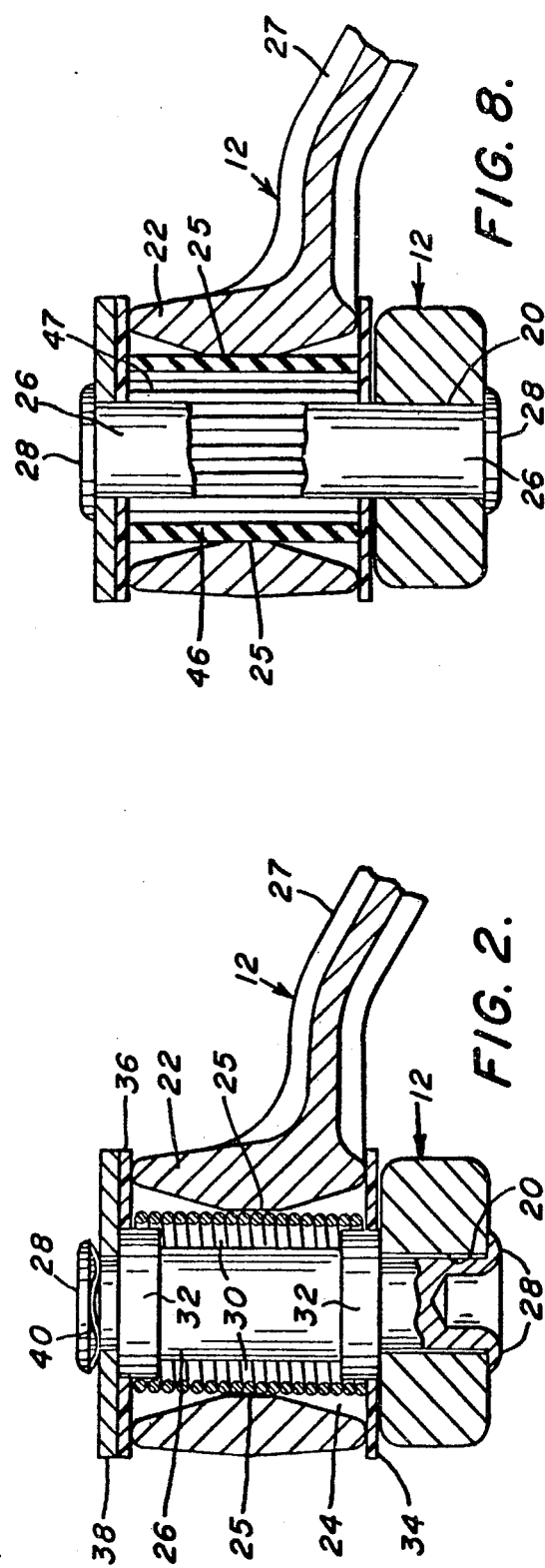

DAMPING SPACERS FOR CONDUCTOR BUNDLES

CROSS REFERENCE TO RELATED APPLICATION

This is a continuation-in-part application of Ser. No. 626,975, filed Oct. 29, 1975, now U.S. Pat. No. 3,971,881.

BACKGROUND OF THE INVENTION

The present invention relates to a conductor bundle damping spacer that is structurally strong yet extremely light in weight and economical to manufacture.

In FIGS. 3 and 4 of U.S. Pat. No. 3,617,609, issued on Nov. 2, 1971 in the name of Paul D. Tuttle, a frameless damping spacer is shown having a triangular configuration in side elevation (FIG. 3), the spacer being comprised of three rigid, elongated arms and three conductor clamps, with a pair of the arms connected together at each corner of the spacer. Each arm of the spacer is bifurcated at the end thereof remote from the conductor clamp to provide a yoke of two parallel arm portions, these parallel arm portions being disposed on both sides of a single arm portion of each arm at the location at which the arm portions are connected together. The single arm portion and the yoke arm portions are connected together by a rigid pin and a closed coil, damping spring extending through an opening provided in the single arm portion aligned with openings provided in the arms of the yoke portions. In addition, the yoke arm portions are spaced from the sides of the single arm portion by open coil springs surrounding the closed coil spring.

Structures similar to the damping spacer of the above Tuttle patent for spacing and damping two conductor bundles are shown in FIGS. 1 to 3 of the present inventor's U.S. Pat. No. 3,870,815, (Hawkins) issued on Mar. 11, 1975.

As shown in the Tuttle and Hawkins patents, the damping springs are generally exposed to the surrounding elements though, as depicted in FIG. 1 of the Hawkins patent, the damping springs can be enclosed by a cylinder or sleeve 36 employed to center the center arms of the spacer on the springs. In addition, the damping springs might be enclosed by additional means, such as elastomeric boots, though the use of such additional components would involve additional costs that would be reflected in the cost of the damping spacer. Similarly, the cost of the centering cylinders is reflected in the cost of the damping spacer.

Further, in the Tuttle and Hawkins devices it will be noted that rather long springs and spring retaining pins are employed. As can be appreciated, a long pin or shaft will be susceptible to bending moments that a short pin will not encounter. Thus, the long pins in the Tuttle and Hawkins spacers are generally of substantial strength, such strength involving costly pin structures resulting in a costly spacer device.

Another aspect of the Tuttle and Hawkins devices is the nature of the casting and manufacturing processes involved. It will be noted that the holes provided in each yoke portion of these devices extend in a direction perpendicular to the plane of the yoke. Such holes are therefore difficult to cast because it is impossible to remove the yoke and its clamp portion from a sand mold if metal extends in a direction (in such holes) normal to the direction the component is removed from the mold. Thus, to provide the spacer arms of the Tuttle and Hawkins devices with appropriate holes, the holes must be drilled, which drilling is reflected in the cost of the completed spacing device.

Brief Summary of the Invention

The present invention is directed to a bundle conductor, frameless damping spacer that is greatly reduced in weight, provides weather protection for the damping spring, and has manufacturing simplicity, and other advantages (as explained in detail hereinafter) over those of the above Tuttle and Hawkins devices. Briefly, the invention employs identical clamp arm structures disposed together to provide a rigid spacing device, with an integral housing structure being located at one end of each arm and an opening extending through the housing, the opening wholly containing a damping mechanism, such as a closed coil spring or elastomer cylinder concentric with the axis of the opening. In one embodiment of the invention, a pair of clamp arms are secured together adjacent the corners of a triangle formed by three of the clamp arms by a rigid rivet pin extending through a small hole in one arm and through the opening and the damping spring in the other arm (of the pair), the only separation of the arms at the location of the pin being that provided by a heat resistant, frictional washer. A spring washer can be used to force the housing and frictional washers (located at both ends of the housing) together to seal the housing.

Since the damping mechanism, a close coil spring, for example, is wholly contained and preferably sealed within the opening in each arm, to effect relative sliding movements of the spring coils, the opening is provided with a varying diameter that defines an inwardly protruding portion, in longitudinal section, with the longitudinal center of the protruding portion being located adjacent the longitudinal center of the spring. This protruding portion engages the central portion of the spring to force translation of the coils thereof transverse to the longitudinal axis of the spring when one or more of the conductors spaced by the spacer vibrates or oscillates.

Further, the operation of the damping spacer of the present invention is such that with the movement of one overhead conductor all of the damping mechanisms are set into motion to provide damping.

In addition, the invention makes use of a cold weather, conductor bushing that provides ease of installation and reduces articulation stresses on the arms of the spacing device.

THE DRAWINGS

The advantages and objectives of the invention will best be understood from the following detailed description when read in conjunction with the accompanying drawings of which:

FIG. 1 is a front (or rear) elevation view of a three conductor damping spacer embodiment of the invention;

FIG. 2 is a sectional view taken along II—II of FIG. 1;

FIGS. 3 and 4 are end elevation views of the embodiment of FIGS. 1 and 2;

FIG. 5 is an enlarged sectional view taken along lines V—V of FIG. 1;

FIG. 6 is a side elevational view of a single arm casting of the invention;

FIG. 7 is a sectional view of a washer suitable for use in the present invention;

FIG. 8 is a sectional view of an elastomer damping means suitable for use in the present invention;

PREFERRED EMBODIMENTS

Figure 10:
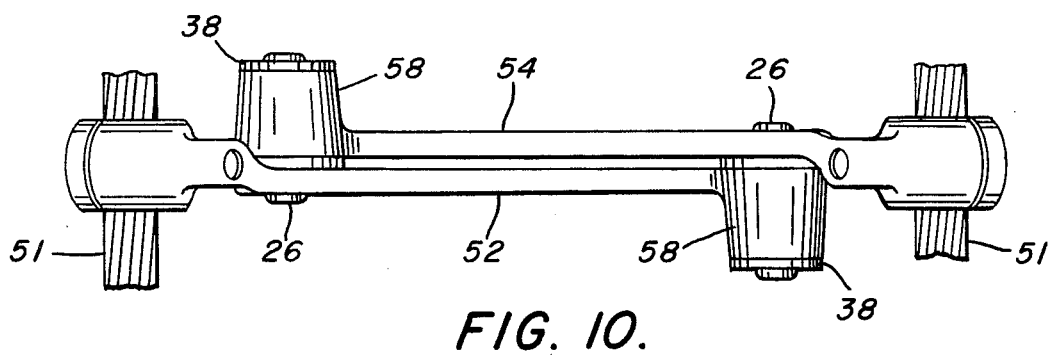
FIG. 10 is a plan view of the embodiment of FIG. 9.

Referring now to the drawings, FIGS. 1 to 5 show a damping spacer embodiment of the invention for a three conductor bundle, the damping spacer being generally designated by numeral 10. Damping spacer 10 comprises three elongated, rigid and identical spacer arms 12, with each arm including an integral clamp half 14 at one end thereof for clamping the arm, in cooperation with a second clamp half 16 and a bolt 17, to a conductor 18. The cooperating clamp halves 14 and 16 (with their conductor receiving grooves) form a unitary clamping member. Between conductor 18 and the clamping member are located resilient, elastomer bushing halves 19 that are respectively secured within the clamping halves of the clamping member, the bushing halves being fluted for purposes explained hereinafter.

Each arm 12 is further provided with a hole 20 (FIGS. 2 and 6) located a relatively short distance from and rearwardly of its clamp half 14 (as best seen in the sectional view of FIG. 2), and an integral housing 22 located at the end thereof remote from the clamp half, the axes of the housing and hole being perpendicular to that of the arm. A cast opening 24 is provided in and extends through each housing, only one of which is shown in FIG. 2, the opening having a diameter that decreases in the direction of its longitudinal center from the opposed ends thereof to provide a protruding internal surface 25. The internal surface is shown provided with a flat portion closely adjacent to or in direct physical contact with a helical spring 30, described in particular hereafter.

Each spacer arm 12 is formed with an offsetting bend 27 near the housing end thereof in order to prevent the arms from contacting one another during relative movement of the arms, and to place the clamping members of the arms in the same plane. This, in turn, places mechanical loads along the center line of the beam of the arms. The offset is in the direction of housing 22 such that when the arms are placed together to form spacer 10, two of the arms are oriented to have their housings face in one direction while the housing of the third arm faces in the opposite direction, as best seen in the end views of FIGS. 3 and 4.

The arms, with their clamp halves and housings, can be conveniently and inexpensively cast requiring little or no finishing or machining operations since there is no yoke to be cast and no holes and openings lying in a direction that requires drilling or finishing operations. This is appreciated by viewing the single arm structure of FIG. 6. In FIG. 6, the parting line of a sand mold (not shown) is indicated by line 29 which extends along the vertical center of the structure. (The portion or section of the mold above the parting line is called the cope portion, and the portion below the parting line is called the drag portion, as labelled.)

In addition, the spacer arms 12 of the present invention can be cast or otherwise formed to have a minimal thickness dimension, as best seen in FIG. 5 of the drawings, which minimal dimension requires a minimal amount of metal, thereby providing a spacing structure having minimal weight and cost characteristics. The reason that the spacer arms can be relatively thin structures is due to the location at which the arms are connected together, such locations providing a short lever arm that places minimal cantilever action on the arms when the conductors, to which the arms are clamped, vibrate or oscillate. Thus, a massive clamp and spacer arm is not required in the structure of the present invention.

As indicated earlier, damping spacer 10 is made by placing spacer arms 12 together in a triangular configuration so that at each corner of the configuration a pair of arms 12 are located together in overlapping relationship. As best seen in FIG. 2, hole 20 provided in one arm near its clamp half 14 is aligned with the opening 24 provided in housing 22 of another one of the three arms to receive therethrough a rigid rivet pin 26, the pin providing a high strength boss 28 at each end of the pin, when riveted, that functions to secure the pair of arms together.

Before, however, the arms 12 are secured together, a close coil, helical spring 30 is located in opening 24, as shown in FIG. 2, so that pin 26 extends axially through the spring, as well as through the arm openings, to secure the spring within opening 24. The internal diameter of the spring is substantially larger than the outer diameter of the shank of the pin, and is centered on the pin by integral shoulders 32 located adjacent the ends of the pin but within opening 24 of each arm 12. The outer diameter of the spring is sized to fit within and preferably in physical contact with the internal surface of the narrowest portion 25 of housing 22.

In addition, each of the three springs 30 employed in spacer 10 may be of a different size and/or resilience to provide the spacer with a variable damping rate capability, i.e., the spacer can thereby respond and function more efficiently to different wind conditions in the process of dissipating different energies of conductor vibration and oscillation, as explained hereinafter.

Preferably, a washer 34 is located between a pair of arms at each corner of the triangular spacer structure, the washer being made of heat and wear-resistant material capable of permitting sliding friction between the washer and the arm surfaces engaging the washer. As shown in FIG. 2, washer 34 is located between the end of housing 22 and the spacer arm located adjacent thereto. An additional heat and wear resistant washer 36 is shown located at the other end of housing 22, and beneath a strong metal washer 38, the metal washer cooperating with boss 28 of pin 26 extending over washer 38 to secure the arm pair and washers together.

In order to seal housing 22 against atmospheric conditions that might harm the damping spring within the housing, and to place a predetermined load on the friction washers 34 and 36, a spring washer 40 (FIG. 2) can be used between boss 28 of rivet pin 26 and metal washer 38. The resilience of washer 40 functions to force washers 34 and 36 against the ends of housing 22, which seals the same while simultaneously providing the load on the washers. Washer 40 is shown as a "wave washer" but other resilient washers and devices can be used for these purposes.

Because of the sealing function, and as explained in greater detail hereinafter, washers 34 and 36 are preferably large diameter washers that extend beyond the outside diameter of each housing 22.

With the spacer arms mechanically interconnected in the manner just described, a strong, rigid spacer structure is provided using a minimum of inexpensive components.

The number of components of spacer 10 can be reduced further by using a metal washer 42 (FIG. 7) coated with a heat resistant material 43, in place of washers 36 and 38 (FIG. 2). In use, the coated portion of the washer would be located adjacent or in physical contact with the outwardly facing end of housing 22.

In using the spacer 10, as thus far described, when any one or more of the conductors 18 undergoes vibration or oscillation, the vibrating or oscillating motion thereof is imposed upon arm 12 of the clamping member (14, 16) clamped to the moving conductor, the arm, in turn, translating the motion to the other two arms because of the mechanical interconnection of the three arms. With the three arms set in motion by the vibrating conductor, the protrusion 25 in the housing of each arm translates the center coils of each spring 30 transverse to their longitudinal axes. The adjacent coils of each spring are in physical contact with each other (under the initial tension of the spring, as determined by the design parameters thereof) such that when one adjacent coil slides relative to another, friction occurs between the coils of the spring to dissipate the energy of the conductor vibration in the form of heat. This heat is dissipated to the structure of housing 22 surrounding each spring and to the clamp arms.

In addition, with relative, lateral motion of the clamp arms, the friction discs 34 and 36 (or 42, 43) slide relative to the arms and spring housings to provide further damping of the energy of the conductor vibration via heat dissipation to the housings, to the metal washer and to the rigid pin. The extent of the relative, lateral motion of the friction discs and the ends of the housing is not such that the outside edges of the discs will come within the bounds of openings 24 of the housings such that the washers will cease to seal the inside of each housing from the atmosphere outside the housing. Rather, the rigid pins 26 will limit movement of the arms and housings such that the openings 24 of the housings will remain within the bounds of the washers.

The rigid pins 26, in addition, help to protect damping spring 30 against articulation stresses that are the result of the conductors 18 moving relatively to each other in a direction along their longitudinal axes. With such relative conductor movement the clamp arms are relatively displaced in the direction of the conductor displacement. The rigid pins, however, prevent bending moments from being placed on the damping springs, the rigid pins being effective to resist relative movement of the arm pairs at the corners of spacer 10.

Rather, the thick bushings 19 in the clamp halves of the spacer arms relieve the spacing structure 10 of articulation stresses though such bushings ordinarily tightly engage the conductor under the force of clamping members. To provide further relief of articulation stresses, the bushings can be provided with longitudinally extending flutes 44, as shown in FIG. 1, so that with relative, longitudinal movement of the conductors, the material of the bushings disposed against the conductors can be squeezed and displaced into the channels of the flutes to better accept movement of the conductor relative to the clamp halves. Such displacement of bushing material, in addition, allows easier installation of the damping spacer in cold weather when the material of the bushing halves hardens and is difficult to tighten on the conductor.

In addition, the depths of the channels 44 in the bushings are such that with vibration and oscillation of the conductors, torsional shear of the bushing and certain sliding of bushing within the conductor clamps take place to provide damping of the vibration or oscillation, the material of the bushing having a hysteresis characteristic when worked that dissipates the energy of the conductor motion in the form of heat dissipation to the clamp structures and to the atmosphere adjacent the ends of the bushings.

A similar type of damping action can be employed in housings 22 of the present invention by substituting fluted, elastomer bushings or cylinders 46 for springs 30, as shown in the sectional view of FIG. 8. With relative motion of spacer arms 12, protrusion 25 of housing 22 places cylinder 46 in direct shear by moving the wall of the cylinder in a direction normal to axis of the cylinder and the longitudinal extent of channels 47 provided in the cylinders. The channels assist such direct shear by allowing movement of elastomer mass into and out of the channels against pin 26 with relative movement of the housing and the pin.

Most three conductor bundles are strung in a triangular configuration (in cross section) in which the triangle points downwardly, as shown in FIG. 1. It will be noted that with the damping spacer of the present invention, installed in an overhead bundle, the heads of clamping bolts 17 are in positions that are visible from the ground. In this manner, using bolts having two heads, the outer one which twists off when properly torqued, proper inspection of the installed damper spacer can be made from ground level, to determine if the outer heads of the bolts have, in fact, been twisted off.

In addition, with the clamp arms of the present spacer connected directly to their respective conductors 18 the damping means 30 or 46 do not support the weight of the suspended structure 10 so that the coils of the springs or the bodies of the elastomer cylinders stand ready to respond immediately to conductor motion to provide rapid damping action.

In comparing the weight of a 6.1 pound spacer made in accordance with the principles of the present invention with the frameless embodiment of the spacer shown in FIGS. 3 and 4 of the above Tuttle patent, the spacers being otherwise of identical size and material, an approximate 8.2 pounds saving in weight is provided, the frameless embodiment weighing 14.3 pounds. Such a weight differential is significant in the amount of material saved, and thus in total material cost figures and savings. A saving of 8.2 pounds of metal per damping spacer for the many damping spacers made and used in the industry amounts to substantial savings.

An explanation for such savings in weight lies in part in the light weight components of the present spacers. For example, the damping springs employed in the frameless embodiment of the Tuttle spacer each weighed 1.8 pounds, while the damping springs in the spacer of the present invention weighed only 0.15 pound.

Figure 9:
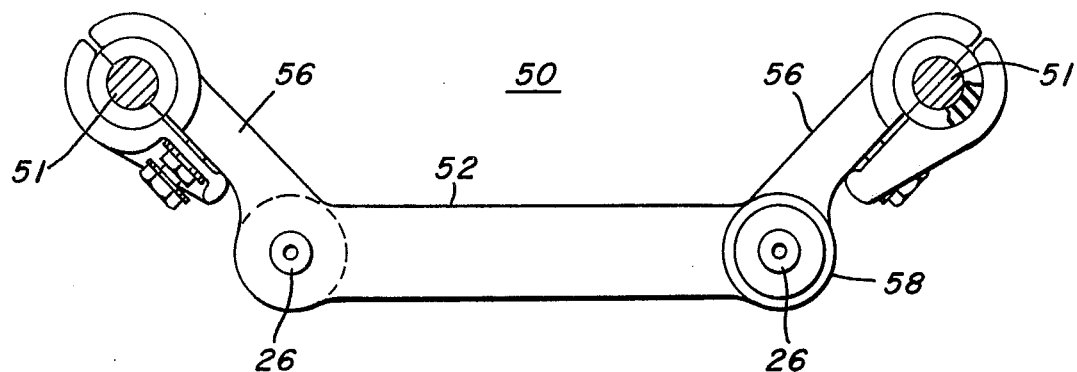
FIG. 9 is an elevation view of a second, two conductor embodiment of the invention.

FIGS. 9 and 10 of the drawings show an embodiment 50 of the invention for spacing the conductors 51 of a two-conductor bundle. As indicated in these figures, the structure of this embodiment is similar to that of the embodiments of FIGS. 1 to 8 except that only two identical spacer arms 52 and 54 are employed, with spacer arms 52 and 54 each having a clamp arm portion 56 extending outwardly from 52 and 54 at an obtuse angle in relation to the longitudinal extent of 52 and 54. As in the case of the previous embodiment, arms 52 and 54 have integral housing portions 58 housing a damping mechanism (not visible in FIGS. 9 and 10), such as the close coil spring 30 or the elastomer bushing 46 discussed above. Similarly, the arms 52 and 54 may be held together in parallel relationship by two, rigid pivot pins 26 extending respectively through housings 58 and through respective, pin accommodating openings (not visible in FIGS. 9 and 10) provided in arms 52 and 54, which are in alignment with the housings of the arms.

The operation of the embodiment of FIGS. 9 and 10 is substantially the same as that described above in connection with the three-conductor bundle embodiment, the angular disposition of clamp arms 56 permitting relative motion of spacer arms 52 and 54 in response to subconductor oscillation as well as aeolian vibration, such motion, in turn, working the damping mechanisms in 58 to dampen the oscillation or vibration.

Figure 11:
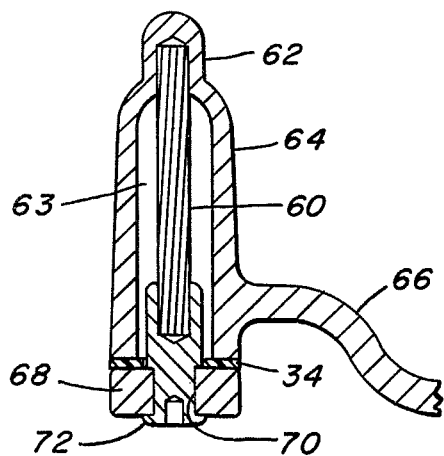
FIG. 11 is a partial sectional view of the damping spacer of the invention showing a stranded cable as the damping mechanism.

FIG. 11 shows an embodiment of the invention in which a stranded cable 60 is employed as the damping mechanism in the damping spacer concept of the invention. In this embodiment one end of the damping cable is securely held in a hollow boss 62 provided at the end of a housing 64, and its cavity 63, remote from and integral with a spacer arm 66. Adjacent housing 64 and arm 66 is arm 68 identical to arm 66, though only one end portion of each arm is presented (in section) in FIG. 11. The spacer arms 66 and 68 each have an opening 70 (only one of which is shown in FIG. 11) aligned with the cavity of housing 64. In opening 70 is disposed a rigid pin 72 adapted to receive and firmly secure the other end of stranded cable 60, the stranded cable extending longitudinally through cavity 63. In this manner, with the vibration or oscillation of one or more of the conductors (not shown) spaced by the device of FIG. 11, relative movement occurs between the arms 66 and 68 and thus between housing boss 62 and pin 72 such that cable 60 is twisted in a manner that provides friction between the strands of cable. This friction dissipates the energy of the vibrating or oscillating conductor in the form of heat, which stops the motion of the conductor.

While the invention has been described in terms of preferred embodiments, the claims appended hereto are intended to encompass all embodiments which fall within the spirit of the invention.

Having thus described my invention and certain embodiments thereof, I claim:

1. A frameless damping spacer for spacing at least two, parallel, overhead conductors, the damping spacer comprising at least two, rigid, spacer arms and conductor clamping members, said clamping members being respectively located adjacent one end of each of the spacer arms, an integral housing provided adjacent the other end of each spacer arm, an opening provided in each arm near the clamping member, and, an opening extending through each housing, said spacer arms being disposed together such that the opening in the housing and the opening near the clamping member of one arm are respectively aligned with the opening near the clamping member and the opening provided in the housing of the other arm, rigid pins extending respectively through the aligned openings in the arms, and a damping mechanism located in the opening of at least one of the housings and mechanically associated with the housing and the pin associated therewith.

2. The damping spacer of claim 1 in which the damping mechanism is a close coil, helical spring located around the associated pin.

3. The damping spacer of claim 1 in which the damping mechanism is a stranded cable extending between the pin and housing.

* * * * *